(No Model.)
J. H. L. TUCK.
CABLE.
No. 488,640. Patented Dec. 27, 1892.
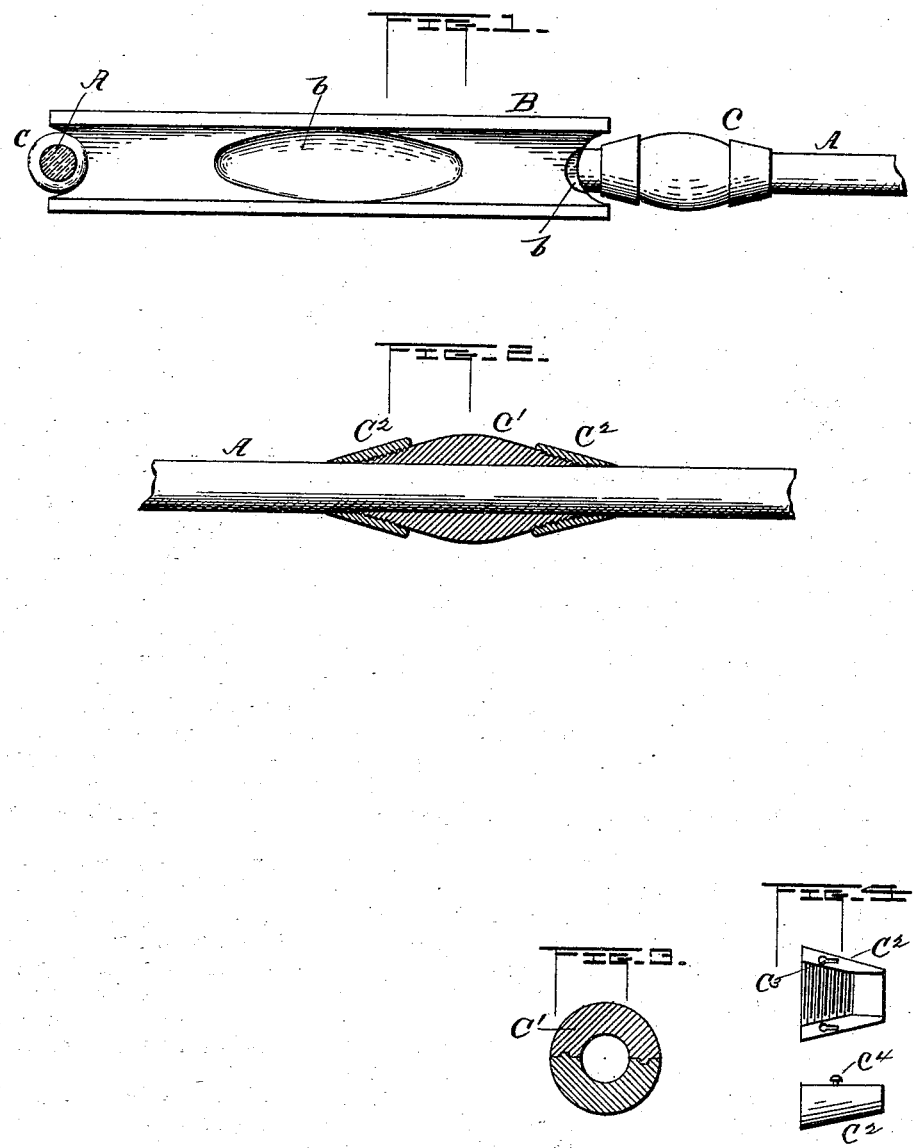

UNITED STATES PATENT OFFICE.

JOSIAH H. L. TUCK, OF SAN FRANCISCO, ASSIGNOR OF ONE-HALF TO E. E. TUCKER, OF STOCKTON, CALIFORNIA.

CABLE.

SPECIFICATION forming part of Letters Patent No. 488,640, dated December 27, 1892.

Application filed September 25, 1891. Serial No. 406,818. (No model.)

*To all whom it may concern:*

Be it known that I, JOSIAH H. L. TUCK, a citizen of the United States, residing at San Francisco, in the county of San Francisco and State of California, have invented certain new and useful Improvements in Cables; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in cables and has for its object the provision of means whereby a cable can be used as a sprocket chain in connection with a pulley provided for the purpose, and consists in securing to the cable suitable bosses at any desired distance apart on the said cable, and securely fastening them to the cable as will be hereinafter more fully described.

The invention further consists in the novel construction and arrangement of parts hereinafter set forth, and more particularly pointed out in the claim hereunto appended.

The accompanying drawings illustrate my said invention, in which

Figure 1 is an edge view of a pulley having certain depressions in it around which the cable is seen as passing. Fig. 2 is an elevation of a portion of the cable showing a boss thereupon in section. Fig. 3 is a transverse central section of a boss formed in two parts splined together. Fig. 4 is a view of the two parts of the separable cap or collar, showing the locking means for securing the said parts together.

Similar letters of reference indicate corresponding parts in all the figures where they occur.

Referring to the drawings by letters A represents the cable, and B is a suitable wheel or pulley upon which the said cable is run. At suitable intervals along the cable I provide bosses C which work in depressions $b$ in the rim of the wheel or pulley, and entirely overcome all tendency to slip thus rendering a cable more efficient in the transmission of power, and making it an effective substitute for the expensive and often unreliable sprocket chain. Each of these bosses consists of an oval sleeve $C'$, which is formed of two or more pieces splined together, as seen in Fig. 3. The sleeves $C'$ are screw threaded on their outer ends for the purpose of receiving the caps or collars $C^2$, by means of which the sleeves are securely fastened to the cable, as is apparent. The sleeve is made in sections for the purpose of attaching it to the cable at any desired point, and for this purpose also the sectional cap or collar $C^2$ is made, so that the two can be applied to the cable at any time and at any place with out any trouble. This separable collar, shown in Fig. 4, is divided longitudinally, and is provided on one part with a locking slot $C^3$, and on the other parts with the locking heads $C^4$, which hold the parts securely together when securely united, as will be readily understood. The reduced portion of the locking slot being under-cut to receive the head $C^4$ and hold it securely in place when the parts are fastened together. The interior of this collar or cap is screw threaded for the purpose of screwing it onto the threaded ends of the sleeve, as is evident. If desired the interior of the entire sleeve may be screw-threaded or serrated for the purpose of being held more securely to the cable.

This device is applied to any cable in the following manner. The several parts of the sleeve are placed upon the cable, and held in place thereon. The separable caps or collars are then placed upon the cable and securely locked, as is apparent, they are then screwed upon the threaded ends of the sleeve and compress the same securely upon the cable, as is apparent.

Having thus described my invention, what I claim and desire to secure by Letters Patent of the United States is:

A cable provided with bosses consisting of longitudinally divided sleeves and separable collars threaded thereon, and having means for locking the parts of said collars together, as set forth.

In testimony whereof I affix my signature in presence of two witnesses.

JOSIAH H. L. TUCK.

Witnesses:
LEWIS B. HARRIS,
VICTOR HUNSER.